July 14, 1970
F. E. CRIPE ET AL
3,520,134
SECTIONAL ANNULAR COMBUSTION CHAMBER
Filed Feb. 26, 1969
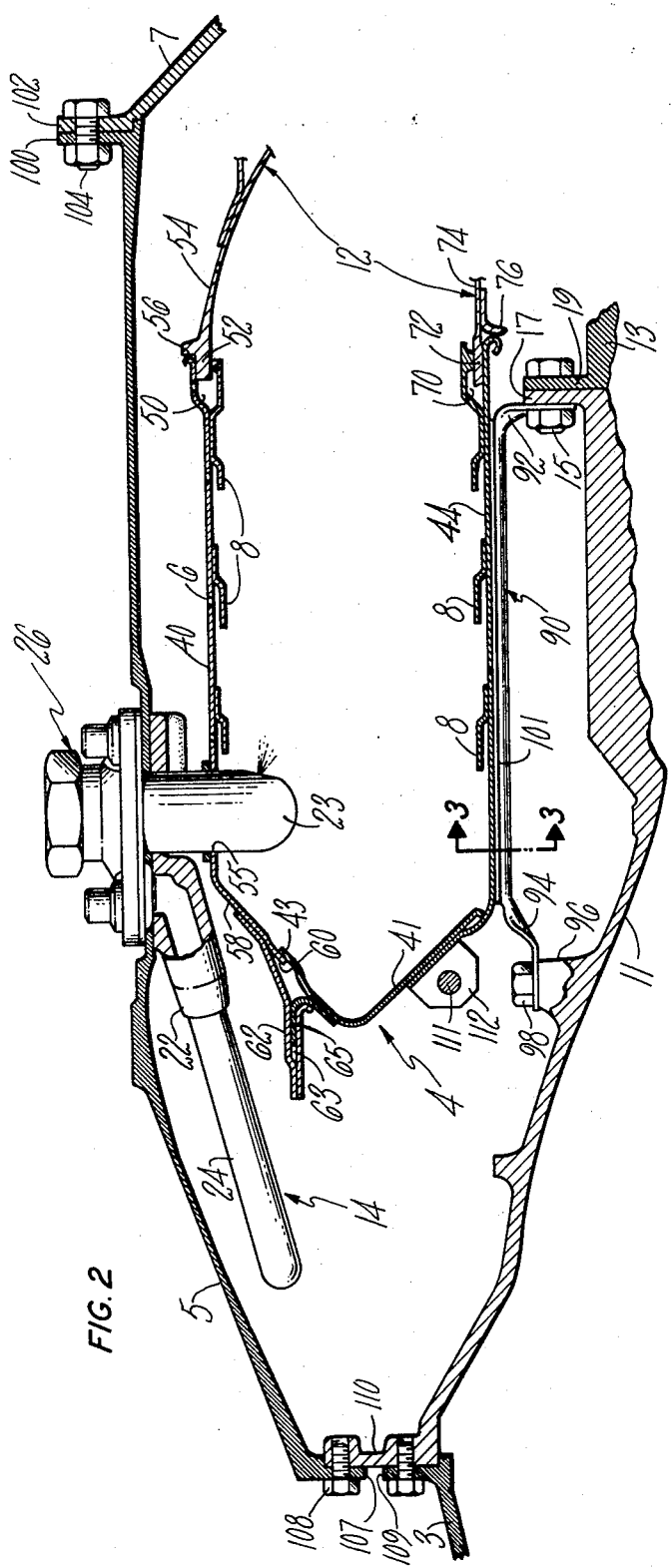
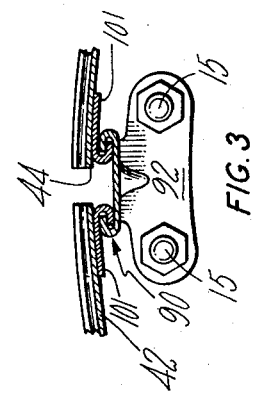
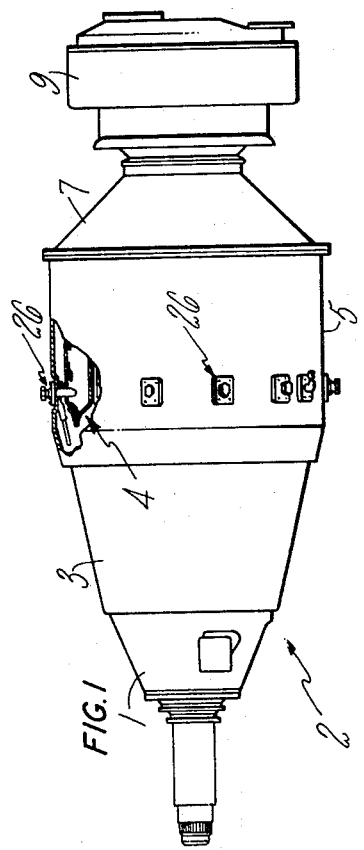
INVENTORS
FREDERICK E. CRIPE
JAMES C. DE LONGA
BY *Jack N. M. Carter*
AGENT United States Patent Office 3,520,134
Patented July 14, 1970

3,520,134
SECTIONAL ANNULAR COMBUSTION CHAMBER
Frederick E. Cripe, North Palm Beach, and James C. De Longa, Palm Beach Gardens, Fla., assignors to United Aircraft Corporation, East Hartford, Conn., a corporation of Delaware
Filed Feb. 26, 1969, Ser. No. 802,429
Int. Cl. F02c 7/00
U.S. Cl. 60—39.69
10 Claims

ABSTRACT OF THE DISCLOSURE

A gas turbine power plant having an outer casing contains an annular combustion chamber. This combustion chamber is formed in sections with an outer annular section being connected to the engine casing by fuel nozzle assemblies. The inner annular wall of the combustion chamber is formed of two semi-circular sections which are mounted on an inner support housing. In its assembled position the rear end of the outer annular section has a slip joint with a fixed member within the engine and the forward part of the annular section has a slip joint with each of the semi-circular inner sections of the combustion chamber. The two semi-circular sections are held together at their forward end by brackets and are connected to the inner support housing by two track members, one located at each line where edges of the sections come together. The rear ends of the two semi-circular sections each have a slip joint with a fixed member within the engine. A portion of the outer casing along with the fuel manifold and outer annular section of the combustion chamber can all be removed as a unit and the inner semi-circular sections of the burner can then be individually removed if necessary.

The invention herein described was made in the course of or under a contract with the Department of the Army.

BACKGROUND OF THE INVENTION

This invention relates to sectionalized combustion chambers where they can be removed with a minimum of breakdown of the remainder of the engine. In the past, various arrangements have been used but they do not provide the flexibilty that is disclosed herein. U.S. Pat. No. 2,709,894 shows an arrangement whereby combustion chamber walls can be removed from an engine without dismantling adjacent parts of the engine's structure.

SUMMARY OF THE INVENTION

A primary objective of this invention is to provide an improved engine construction which will permit disassembly of an engine in the combustion chamber area providing access to the entire combustion chamber and requiring removal of only a portion of the casing.

In accordance with the present invention a combustion chamber is provided in which an annular outer section can be removed along with a section of the engine casing and manifold assembly while not interfering with either the compressor or turbine sections.

BRIEF DESCRIPTION OF THE DRAWINGS

FIG. 1 is a view of a gas turbine power plant having the outer casing broken away to show the combustion chamber and part of the fuel manifold system.

FIG. 2 is an enlarged view of the combustion chamber showing a portion of the fuel manifold system.

FIG. 3 is a cross-sectional view taken on the line 3—3 of FIG. 2.

DESCRIPTION OF THE PREFERRED EMBODIMENT

Referring to FIG. 1, the gas turbine power plant 2 is of the type shown in U.S. Pat. No. 3,152,443. This power plant has a casing made up of five parts: a nose casing 1, an attachment casing 3, an intermediate or outer combustor casing 5, a compressor casing 7 and an inlet casing 9. These sections are all fixed together. While the connection of casing 1 to casing 3, and casing 7 to casing 9 can be by any means desired, the connections between casing 3 and casing 5, and casing 5 and 7 will be hereinafter described more in detail. An annular inner support housing 11 forms an annular chamber with casing 5 and an annular combustion chamber 4 is located between the intermediate or outer combustor casing 5 and inner support 11 in said chamber. Another inner housing 13 is shown partially in section. Housing 11 and 13 are fixed together by bolts 15 through mating annular flanges 17 and 19. Air flows from a source to an area around the annular combustion chamber 4. This chamber 4 has openings 6 throughout for the passage of air thereinto from said area. Baffles 8 are provided to obtain a better mixing of the air being admitted with the fuel being injected. The mixture of fuel and air is ignited and the gases from this mixture pass through the exit 12. In the engine shown these gases pass to a turbine.

The fuel manifold system 14 is shown in detail in application Ser. No. 802,428 being filed herewith for a Fuel Manifold System to Robert F. Udell et al. This fuel manifold system includes manifold tubing 24 and 22 along with a plurality of nozzle assemblies 26, each of which has a nozzle heatshield cover 23 projecting inwardly towards the center line of the engine. A plurality of these nozzle assemblies 26 are located on the intermediate or outer combustor casing 5 and are equally spaced therearound.

The combustion chamber 4 is composed of three main parts, (1) an annular ring outer section 40 forming the outer wall of the combustion chamber, (2) a semi-circular inner section 42 forming one half of the inner wall of the combustion chamber, and (3) another cooperating semi-circular inner section 44 forming the other half of the inner wall of the combustion chamber.

The outer combustion chamber ring 40 is formed at its rear end having an annular slot 50. This slot is arranged to have sliding engagement with a projecting annular member 52 on the outer wall 54 of the exit 12. The rear end of the ring 40 engages an outwardly extending annular flange 56 to provide a bottom seat and properly position the ring 40 during assembly. The section 40 extends forwardly to a point adjacent nozzle covers 23 and then bends at an angle of approximately 45 inwardly a short distance forming a flange 58. This projecting annular flange 58 has a flat portion 60 at its end and a forwardly projecting flange 62. This flange 62 is formed having an annular slot opening 63 facing rearwardly to receive semi-circular members to be hereinafter described.

Nozzle covers 23 extend through openings 55 in the wall 40. It can be seen that in its assembled position the wall 40 is positioned at its rear exhaust end by the slip joint and held in position by the nozzle covers 23 at its forward ignition end.

Each semi-circular inner section 42 and 44 is formed at its rear end having a substantially semi-circular slot 70. This slot is arranged to have sliding engagement with a portion of projecting annular member 72 on the inner wall 74 of the exit 12. The rear end of each inner section 42 and 44 engages an inwardly extending flange 76 to provide a bottom seat and properly position the semi-circular inner sections 42 and 44 during assembly. These sections 42 and 44 extend forwardly to a point which will be substantially in axial alignment with the bend in the section 40 when the sections are properly assembled. These sections 42 and 44 bend at an angle outwardly to have engagement with the flat portion 60 and annular slot opening 63 of the annular flange 58 which extends from the ring member 40.

Each section 42 and 44 is formed at its forward end having a flange 41 which extends outwardly at an angle of approximately 45°. An end portion of each flange bends rearwardly at an angle of approximately 90° towards the flange 58. A flat portion 43 at the end of the bent portion engages flat portion 60 of flange 58. A flange 65 extends forwardly from the rearward bent portion of each flange 41. These flanges 65 each have a slidable engagement with a portion of the annular slot opening 63. A bracket 112 extends from the flange 41 of each inner section 42 and 43 adjacent each free edge. This placed two brackets of each inner section adjacent each other when the combustion chamber is assembled. A bolt 111 connects each cooperating pair of brackets together to retain the ring shape of this point during combustion.

A track guide 90 for each pair of mating edges of semi-circular inner sections 42 and 44 is located at two desired locations on the inner support housing 11 of the engine which are diametrically opposed. Since the inner sections are semi-circular, they must be held together at their adjacent edges to properly position them in their assembled position and to retain the annular shape of the combustion chamber during operation in view of the pressures reached. Each holding track 90 has an inwardly extending flange 92 at its rearward end and a forwardly extending flange at its forward end. The flange 92 has two spaced bolt holes and these are formed to mate with openings in the annular flanges 17 and 19. Two of the bolts 15 extending through the flanges 17 and 19 fixedly hold flange 92 in its proper location. Flange 94 also has two openings therein for attachment and these are positioned over a cooperating boss 96 which is formed to threadably receive bolts 98 for fixedly positioning the forward end of each holding track 90. As seen in FIG. 3, adjacent edges of the inner sections 42 and 44 have edge strips 101 fixed thereto with their ends bent to form a U-shaped groove along the edge. Each holding track 90 is formed having an elongated plate with its outer ends bent to provide two U-shaped lengthwise grooves on each side. A groove of each of the inner members 42 and 44 engages a cooperating groove of the holding tracks 90.

The connection between casing 5 and casing 7 is formed by bolting together two outwardly extending flanges 100 and 102 by a plurality of bolts 104 around the circumference. Casing 5 is connected to casing 3 through an outwardly extending annular flange 110 on the front of the inner support housing 11. A flange 107 on casing 5 is bolted to flange 110 around its outer periphery and a flange 109 on casing 3 is bolted to flange 110 around its inner periphery.

In disassembly, the removal of bolts 104 and 108 permits the intermediate or outer combustor casing 5, annular ring outer section 40, nozzle assemblies 26 and tubing 24 and 22 to be removed as a unit by sliding forwardly. The slot 50 at the rear of the ring section 40 will slidably move along the projection 52 and the slot 63 at the forward part of the ring 40 will slidably move from the flanges 65. The forward end of the ring section 40 is dimensioned so that it passes over the flange 110 on the inner support housing 11. Now the fuel manifold and ring section 40 can be inspected as can the inner sections 42 and 44 of the combustion chamber. If further inspection is necessary, the two bolts 111 holding the two pair of flanges 112 can be removed, then the sections 42 and 44 can be slid forwardly until the slot has been removed from around the projection 72. Then if the sections 42 and 44 are flexible enough, they can each be removed from the holding tracks 90 by spreading its sections and unhooking the cooperating grooves. If they are too rigid the four bolts 98 have to be removed first before the sections 42 and 44 are slid forwardly and then the four bolts 15 holding the rearward flanges can be removed permitting disassembly of 42 and 44 for removal.

We claim:
1. In combination in a gas turbine engine having an outer casing,
   (a) said casing having a section which is substantially cylindrical with a first inwardly extending annular flange means at one end,
   (b) means on said engine for releasably holding the free ends of said section for axial removal of said section from the engine,
   (c) an annular combustion chamber means in said section,
   (d) the outer side of said combustion chamber means being formed by an annular outer wall,
   (e) said outer wall having a second inwardly extending annular flange means at one end,
   (f) said second inwardly extending annular flange means on said outer wall extending to an inward location which will permit it to axially move past the means on said engine for releasably holding the free end of said first inwardly extending flange,
   (g) the inner side of said combustion chamber means being formed by an annular inner wall,
   (h) said inner wall having an outwardly extending annular flange means at one end,
   (i) means fixedly positioning said outer wall to said outer engine casing,
   (j) means fixedly positioning said inner wall with respect to said engine,
   (k) said second inwardly extending annular flange means having a slip joint with said outwardly extending annular flange means,
   (l) the other end of said annular outer wall having an annular slip joint with the outer wall of an annular exit passageway.
2. A combination as set forth in claim 1 wherein:
   (m) said annular inner wall is formed by a multiplicity of arcuate wall sections.
3. A combination as set forth in claim 2 wherein:
   (n) said wall sections are connected to each other where they meet and with the engine by track means fixed to the interior of the engine,
   (o) each of said wall sections being slideable for a distance on its two cooperating track means when said outer wall is removed.
4. A combination as set forth in claim 1 wherein:
   (m) the slip joint between the second inwardly extending annular flange means and the outwardly extending annular flange means includes an axially extending annular projection on said outwardly extending annular flange means and a mating annular groove on said second inwardly extending annular flange.
5. A combination as set forth in claim 1 wherein:
   (m) said means fixedly positioning said outer wall to said outer engine casing including a plurality of members projecting inwardly from said outer engine casing and into said outer wall.
6. A combination as set forth in claim 5 wherein:
   (n) said members projecting inwardly project into the combustion chamber to an inward location which is radially outward from the location of the end of the second inwardly extending annular flange means.
7. A combination as set forth in claim 1 wherein:
   (m) the other end of said annular inner wall has an annular slip joint with the inner wall of an annular exit passageway.

8. A combination as set forth in claim 3 wherein:
(p) said track means is removable to facilitate the removal of the wall sections.
9. A combination as set forth in claim 1 wherein:
(m) said means for releasably holding the free end of said first inwardly extending flange including an outwardly extending flange from the outer casing adjacent said section,
(n) said outer edge of the outwardly extending flange from the outer casing adjacent said section being located inwardly from the inner edge of the second inwardly extending annular flange means.
10. A combination as set forth in claim 5 wherein:
(n) each inwardly projecting member can be individually removed from the exterior of said casing.

References Cited

UNITED STATES PATENTS

| | | | |
|---|---|---|---|
| 2,709,894 | 6/1955 | Oulianoff | 60—39.65 |
| 2,913,873 | 11/1959 | Murray | 60—39.65 |
| 2,988,886 | 6/1961 | Hamm | 60—39.65 |
| 3,152,443 | 10/1964 | Newland | 60—39.16 |

DOUGLAS HART, Primary Examiner

U.S. Cl. X.R.

60—39.31, 39.36, 39.65